US010826750B2

(12) United States Patent
Tseng et al.

(10) Patent No.: US 10,826,750 B2
(45) Date of Patent: Nov. 3, 2020

(54) PATRICIA TRIE FOR SIMPLE NETWORK MANAGEMENT PROTOCOL MANAGEMENT INFORMATION BASE OPERATIONS

(71) Applicant: HEWLETT PACKARD ENTERPRISE DEVELOPMENT LP, Houston, TX (US)

(72) Inventors: Dennis Tseng, Taipei (TW); Min-Lin Lu, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/264,655

(22) Filed: Jan. 31, 2019

(65) Prior Publication Data
US 2020/0252260 A1  Aug. 6, 2020

(51) Int. Cl.
*H04L 12/24* (2006.01)
*H04L 12/751* (2013.01)
(52) U.S. Cl.
CPC ...... *H04L 41/0213* (2013.01); *H04L 41/0233* (2013.01); *H04L 41/0293* (2013.01); *H04L 41/046* (2013.01); *H04L 45/02* (2013.01)
(58) Field of Classification Search
None
See application file for complete search history.

(56) References Cited

U.S. PATENT DOCUMENTS

| 5,684,988 | A | * | 11/1997 | Pitchaikani | ........... H04L 41/046 |
| 8,218,447 | B2 | | 7/2012 | Rajan et al. | |
| 8,549,119 | B1 | | 10/2013 | Singh et al. | |
| 2003/0023605 | A1 | * | 1/2003 | Sternin | ................. H04L 41/024 |
| 2004/0158625 | A1 | | 8/2004 | Neale | |
| 2009/0049163 | A1 | | 2/2009 | Love | |

FOREIGN PATENT DOCUMENTS

KR        20040001403        1/2004

OTHER PUBLICATIONS

Zhang, X. et al., A High Performance Strategy for Constructing Dynamic MIB, (Research Paper), Fifth International Conference on Information Technology: New Generations (ITNG 2008), Apr. 7-9, 2008, 3 Pgs.

* cited by examiner

*Primary Examiner* — James A Edwards
(74) *Attorney, Agent, or Firm* — Nolte Intellectual Property Law Group

(57) ABSTRACT

A method for use in a Simple Network Management Protocol ("SNMP") computing environment, including: constructing a Patricia trie from an ASCII code representation of a plurality of Object Identifiers for a plurality of respective objects stored in a Management Information Base; searching the Patricia trie using a request Object Identifier; and accessing a requested object associated with the request Object Identifier from the Management Information Base.

18 Claims, 7 Drawing Sheets

PATRICIA TRIE FOR SIMPLE NETWORK MANAGEMENT PROTOCOL MANAGEMENT INFORMATION BASE OPERATIONS

BACKGROUND

Large computing systems frequently use "protocols" to define various aspects of their organization, communication, and operation. Some of these large computing systems are "networks". They include multiple computing apparatuses (e.g., servers, routers, and switches) implementing certain types of architectures in certain topologies using certain protocols. Protocols are usually industry standards and are "rules" that define how the computing apparatuses of the network communicate and interact with one another. Protocols used in networks are frequently referred to as "network protocols", but network protocols are not necessarily limited to use in networks. There are other types of computing systems besides networks, and some of them use "network protocols" even though they technically are not networks.

One network protocol is known as "simple network management protocol", or "SNMP". SNMP is a set of protocols that define an automated management technique. Many computing systems have become sufficiently large and complex that automated tools are used to help manage the computing system and its resources. SNMP is one such tool. More precisely, SNMP is a set of protocols for use in network management and monitoring. Like many network protocols, it is not limited to use in networks per se and can be used in other kinds of computing systems that are not, technically, networks.

BRIEF DESCRIPTION OF THE DRAWINGS

Examples described herein may be understood by reference to the following description taken in conjunction with the accompanying drawings, in which like reference numerals identify like elements.

Figure 1:
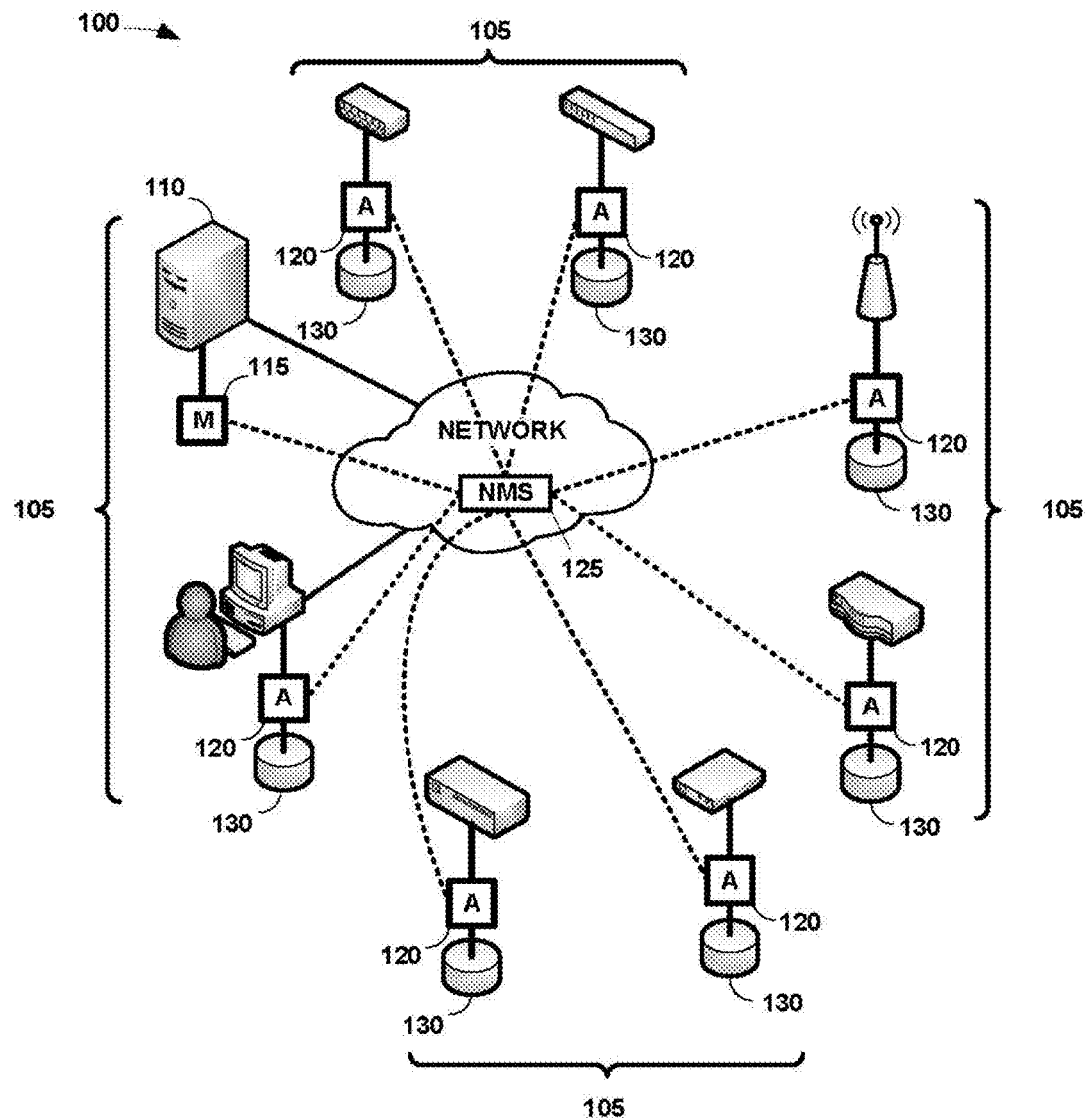
FIG. 1 conceptually illustrates a computing system in which the subject matter claimed below may be implemented in one example.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

The present disclosure provides a technique by which the efficiency of computing systems employing SNMP may be improved. SNMP, as noted above, is a set of protocols for network management and monitoring of network devices responsive to their conditions of operation. These conditions are managed and monitored for proper, appropriate, and ongoing network administration. The SNMP protocols define an application layer protocol, a set of data objects, and a methodology for storing, manipulating and using data objects in a database schema. The presently disclosed technique modifies the methodology for storing and searching data objects in Management Information Bases ("MIBs") to improve the efficiency of memory usage in MIBs.

In a Simple Network Management Protocol ("SNMP") computing environment, SNMP Agents construct, maintain, and utilize Management Information Bases ("MIBs"). An SNMP Agent responds to an information request from an SNMP Manager by formulating a response using information from its respective MIB. To locate this information, SNMP Agents use either hashes or arrays to index into the MIB. Hashes and arrays have drawbacks when responding to SNMP GET, GETNEXT, and WALK requests used in MIB access and browsing.

More particularly, the GETNEXT operation which can retrieve the value of the next Object Identifier ("OID", or "Object ID") in the MIB tree or even can browse the whole MIB table. To implement GETNEXT operation, most implementations use either a hash or an array data structure. Although the GETNEXT operation is easily implemented with an array data structure, just because the next OID object is immediately located behind the current found object, the operation might waste memory resources if the MIB objects are sparse. When using a hash data structure, after carefully selecting an adaptive hash bucket, the GET operation may conserve the memory resources and improve the search time. For example, for 1.3.6.1.2.1.1.4.5880, one can scramble the OIDs by summing them 1+3+6+1+2+1+1+4+5880 to define a hash key. However, there may be collisions that need more memory for generating a link-list. Still worse, hash is a rather inefficient method of retrieving the NEXT OID object.

The present disclosure obviates the drawbacks of hashes and arrays by constructing and using a Patricia trie. The SNMP Agent constructs a Patricia trie from an ASCII code representation of a plurality of Object Identifiers for a plurality of respective objects stored in a Management Information Base. Upon receiving a SNMP request for data from a SNMP Manager, the SNMP Agent parses the SNMP request to obtain a request Object Identifier; searches the Patricia trie using the request Object Identifier; and accesses a requested object associated with the request Object Identifier from the Management Information Base. The accessed object is then used to formulate the SNMP Agent's response to the request. From the point of view of memory and CPU time domain, the present disclosure provides an efficient data structure to implement the three SNMP operations GET, GETNEXT, and WALK.

Turning now to the drawings, and referring specifically to FIG. 1, a computing system 100 is conceptually illustrated. The computing system 100 is a network in this particular example. The computing system 100 may employ any known type of networking topology such as, without limitation, a bus, star, ring, or other topology. The computing system 100 may employ any type of networking architecture such as a peer-to-peer or client/server architecture, again without limitation. Similarly, any suitable networking protocol may be employed, including SNMP. However, the subject matter claimed below is not limited to networks and may be used in any suitable computing system known in the art using SNMP.

The computing system 100 includes a plurality of network devices 105. Those in the art having the benefit of this disclosure will appreciate that a networked computing system may be more complex than what is shown. These details are routine and conventional and so they are not shown so as not to obscure that which is claimed below. The network devices 105 may include any type of network device known to the art such as, without limitation, routers, hubs, bridges, switches, servers, workstations, printers, modem racks, and other network components and devices. One of the network devices 105, a server 110, hosts a SNMP Manager 115 while the remaining network devices 105 host SNMP Agents 120. While it is possible in some examples to have more than one SNMP Manager 115, each SNMP Agent 120 only reports to one SNMP Manager 115 at a time. Each network device 105 hosting a SNMP Agent 120 also hosts a management information base ("MIB") 130. The MIB 130 is created and maintained by the SNMP Agent 120 as discussed further below.

The SNMP Manager 115 and SNMP Agents 120 are a portion of a network management system ("NMS") 125. A NMS typically is an application or a set of applications that network administrators use to manage a network, its traffic, and its network devices. More specifically, a NMS can be used to monitor network devices and their performance, analyze the performance of network devices, and to manage network devices. In the illustrated example, the SNMP Manager 115 and the SNMP Agents 120 are parts of the NMS 125 (as indicated by the ghosted lines). The SNMP Manager 115 and SNMP Agents 120 are distributed across the computing system 100 as shown and are used by the NMS 125 to monitor, analyze, and manage the performance of the network devices 105.

Each of the network devices 105 is a processor-based device. Depending on the computing demands of the functionality performed by the network device 105, the processor may be some kind of a processing resource such as a CPU, a processor set, a controller, etc. The particular implementation for the processing resource will therefore be role-specific. The network device 105 will also have a memory whose make-up will be role-specific. For example, a server may provide storage for the computing system 100 and so include some kind of mass storage including numerous arrays of hard disks or solid-state drives. A switch, on the other hand, does not need that kind of capacity to perform its role and so may have a relatively smaller amount of read-only memory ("ROM") and random-access memory ("RAM").

Figure 2:
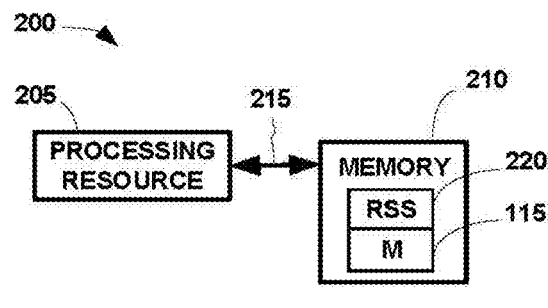
FIG. 2 depicts selected portions of the hardware and software architectures of a network device of the computing system of FIG. 1 hosting a SNMP Manager.
Figure 3:
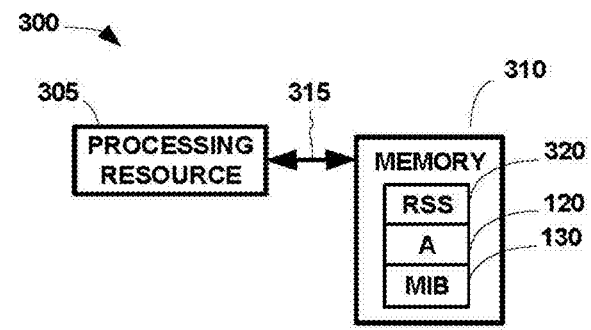
FIG. 3 depicts selected portions of the hardware and software architectures of a network device of the computing system of FIG. 1 hosting a SNMP Agent.

FIG. 2 and FIG. 3 illustrate selected aspects of the hardware and software architecture of a network device 200 hosting a SNMP Manager 115 and a network device 300 hosting a SNMP Agent 120. Referring to FIG. 2, the network device 200 includes a processing resource 205 and a memory 210 communicating over a bus system 215. On the memory 210 resides some role specific software ("RSS") 220 that the processing resource 205 executes over the bus system 215 to implement the functionality of the role of the network device 200 within the computing system 100. The SNMP Manager 115 also resides on the memory 210. Referring now to FIG. 3, the network device 300 includes a processing resource 305 and a memory 310 communicating over a bus system 315. On the memory 310 resides some role specific software 320 that the processing resource 305 executes over the bus system 315 to implement the functionality of the role of the network device 300 within the computing system 100. A SNMP Agent 120 also resides on the memory 310, along with a management information base ("MIB") 130.

The SNMP Manager 115 and the SNMP Agent 120 are also each executed by the respective processing resources 205, 305 over the respective bus systems 215, 315. As a part of the NMS 125 (shown in FIG. 1), they are applications in the illustrated example. However, they typically run in the background of the operations performed by the network devices 200, 300. They therefore may alternatively be implemented as daemons and still other types of software may be used in other examples. In general, they will be implemented and executed as SNMP Managers and SNMP Agents are currently implemented conventional practice.

Figure 4:
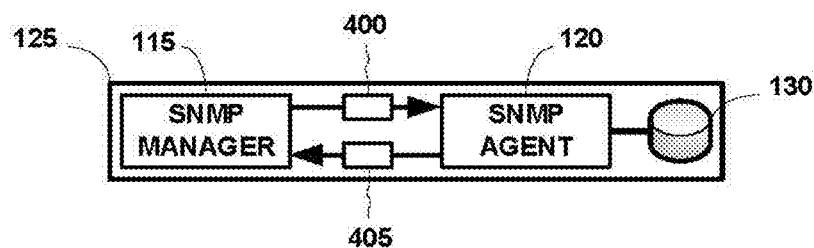
FIG. 4 conceptually illustrates messaging between the SNMP Manager and SNMP Agent of FIG. 2-FIG. 3 in accordance with SNMP protocols.

Referring now to FIG. 4, a SNMP Manager 115 and a SNMP Agent 120 are shown to demonstrate interactions that more generally occur between the SNMP Manager 115 and each of the SNMP Agents 120. The SNMP Manager 115 collects and organizes information from the SNMP Agents 120. The SNMP Agents 120 collect data regarding the operation of their respective network device 105, convert the data into variables and organize the variables into hierarchies and store in the management information base 130, which is a virtual database.

The SNMP Manager 115 and the SNMP Agent 120 communicate with each other using what are called "protocol data units" ("PDUs"). Among these protocol data units are GETNEXT, SETREQUEST, GETNEXTREQUEST, GETBULKREQUEST, RESPONSE, TRAP, WALK, and INFORMREQUEST. Some protocol data units 400, shown in FIG. 4, such as GETREQUEST, for example, may request specific data from the SNMP Agent 120 in the form of variables from the hierarchical databases, or management information bases 130. The SNMP Agent 120 will then formulate and transmit to the SNMP Manager 115 a RESPONSE 405 containing the requested information. More particularly, GETREQUEST is a request from the SNMP Manager 115 to the SNMP Agent 120 to retrieve the value of a variable or, perhaps, a list of variables. The SNMP Agent 120 receives the request, parses the request, and retrieves the value(s) from the management information base 130. The retrieved value is then used to formulate a RESPONSE 405 that the SNMP Agent 120 then transmits to the SNMP Manager 115.

Still more particularly, GETREQUEST is a request from the SNMP Manager 115 to a SNMP Agent 120 to retrieve the value of a variable or list of variables. Desired variables are specified in variable bindings (the value field is not used). Retrieval of the specified variable values is to be done as an atomic operation by the agent. A RESPONSE 405 with current values is returned.

GETNEXTREQUEST is a request from the SNMP Manager 115 to the SNMP Agent 120 to discover the variables that are available and their values. One use for GETNEXTREQUEST is to "walk", or completely traverse, the management information base 130 of the SNMP Agent 120 through iterative GETNEXTREQUEST requests. The SNMP Agent 120 formulates a RESPONSE with the variable binding for the lexicographically next variable in the MIB 130.

WALK is a request from the SNMP Manager 115 to the SNMP Agent to "walk" or completely traverse, the Patricia trie discover the variables that are available and their values. In some respects, this may be conceptualized as a series of concatenated GETNEXTREQUESTs. The SNMP Agent 120 formulates a RESPONSE with the variable binding for the lexicographically next variable in the MIB 130.

Other protocol data units such as SETREQUEST, TRAP and INFORMREQUEST may also be found in the SNMP computing environment but will not be further discussed for the sake of clarity and so as not to obscure that which is claimed below. There may still be other protocol data units in various SNMP versions, as SNMP continues to evolve, or in SNMP-based computing environments that supplement what SNMP implements. The presently disclosed technique can be used with any SNMP protocol data unit that responds with information to a SNMP protocol data unit requesting information.

Returning to FIG. 4, the SNMP Agent 120 builds, maintains, and utilizes the MIB 130 during operation. The MIB 130 is a Patricia trie data structure in which the SNMP Agent 120 stores data objects. In the course of its operation, the SNMP Agent 120 performs the method 500, shown in FIG. 5. The method 500 begins by constructing (at 510) a Patricia trie from an ASCII code representation of a plurality of Object Identifiers for a plurality of respective objects stored in a Management Information Base—e.g., the MIB 130. When the SNMP Agent 120 receives a SNMP data protocol unit 400 from the SNMP Manager 118 requesting information, the SNMP Agent 120 searches (at 520) the Patricia trie using a request Object Identifier from the SNMP protocol data unit 400. The SNMP Agent 120 then accesses (at 530) a requested object associated with the request Object Identifier from the Management Information Base.

The syntax of the SNMP data protocol unit 400 request may be, for instance:
get -v 2c -c public .1.3.6.1.2.1.1.1.0
getnext -v 2c -c public .1.3.6.1
walk -v 2c -c public .1.3.6.1

The manner in which the search is performed will depend on the nature of the request and the number and identity of the objects requested. For example, the GET request may be executed using the following pseudo-code. More particularly, patricia_get( ) is used to implement SNMPGET and will find out the requested object node according to the decision bit. When the db bit is "0", then patricia_get( ) traverses the left child; otherwise when the db bit is 1, then paticia_get( ) goes to the right child.

```
NODE*patricia_get(char         old,        NODE*cur,
    NODE*parent)
{
    while (TRUE)
        db=(old>>(OID_BIT_NUM-cur→db)) & 0x01;
        if (cur→db>parent→db)
            parent=cur
        if (db is equal to 0)
            cur=cur→left;
        else
            cur=cur→right;
        else break;
    return cur
}
```

The search responsive to a GETNEXT request may be executed using the following pseudo-code. Here, patricia_getnext( ) is used to implement SNMPGETNEXT. The procedure steps are same as those for patricia_get( ) except that when object node is found, a further step is performed so that the immediate successor of this found node is found.

```
NODE *patricia_getnext(char oid, NODE *cur, NODE *parent)
{
    if (cur->db <= parent->db)
        if state = nothing-got, then state = node-of-oid-got
        else state = next-node-of-old-got
        return cur;
    db = (old >> (OID_BIT_NUM - cur->db)) & 0x01;
    if (db is equal to 0)
        node = patricia_getnext(oid, cur->left, cur);
        if state = nothing-got, then
            return patrida_getnext(oid, cur->right, cur);
        else if state = node-of-oid-got
            if cur = node
                return patricia_getnext(oid, parent->right, parent);
            else
                return patricia_getnext(oid, cur->right, cur);
    else
        node = patricia_getnext(oid, cur->right, cur);
        if state = nothing-got, then
            return patricia_getnext(oid, cur->left, cur);
        else if state = node-of-old-got
            if cur = node
                return patricia_getnext(oid, parent->right, parent);
            else
                return patricia_getnext(old, cur->fight, cur);
    return cur;
}
```

The search responsive to a WALK request may be executed using the following pseudo-code. In this context, patricia_walk( ) is used to implement SNMPWALK and will traverse all sub-children of that requested object node.

```
void patricia_walk(char oid, NODE*cur, NODE*parent)
{
    if (parent && cur→db<=parent→db)
        if (oid<=cur→oid)
            printf("node(%d. %d)\n", cur→db, cur→oid);
        return;
    patricia_walk(oid, cur→left, cur);
    patricia_walk(oid, cur→right, cur);
}
```

The Patricia trie is developed from a compressed binary trie. A "trie" is an ordered tree data structure used to store an associative array and in which the keys are usually strings. A binary trie is a trie in which each node is limited to only two children. The Patricia trie is compressed by merging each single child node with its parent node. Each element node has an associated bit-number, either 0 or 1, to let a search algorithm decide which target bit should be compared. If the compared bit value is 0, the search goes to left child, otherwise, it continuously goes to right node.

Unlike a binary trie, unused element nodes can be eliminated in a Patricia trie by compression. This is why a Patricia trie can save memory resources for MIB parsing in the system initial phase when the MIB is built. However, even after compression a Patricia trie is still a binary trie since each node still has no more than two child nodes. Binary trie searches are therefore highly adaptive for Patricia tries. For example, one can use an INFIX search algorithm to browse a binary trie. The NEXT object will be the in order immediate successor of current found node.

Figure 5:
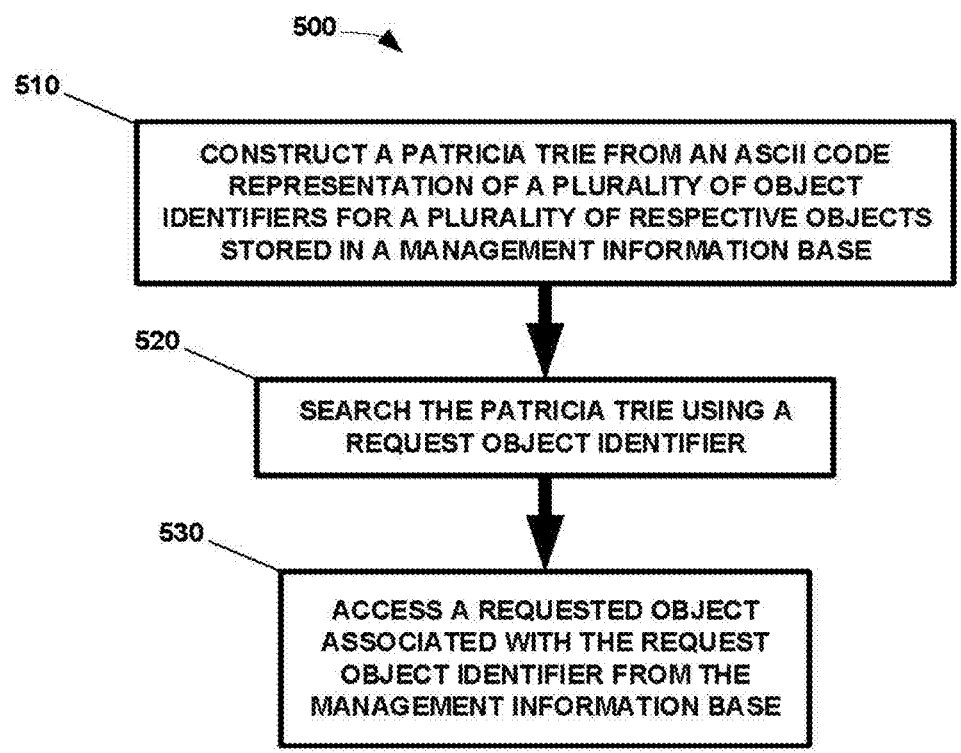
FIG. 5 depicts a method performed in accordance with one or more examples disclosed herein.
Figure 6:
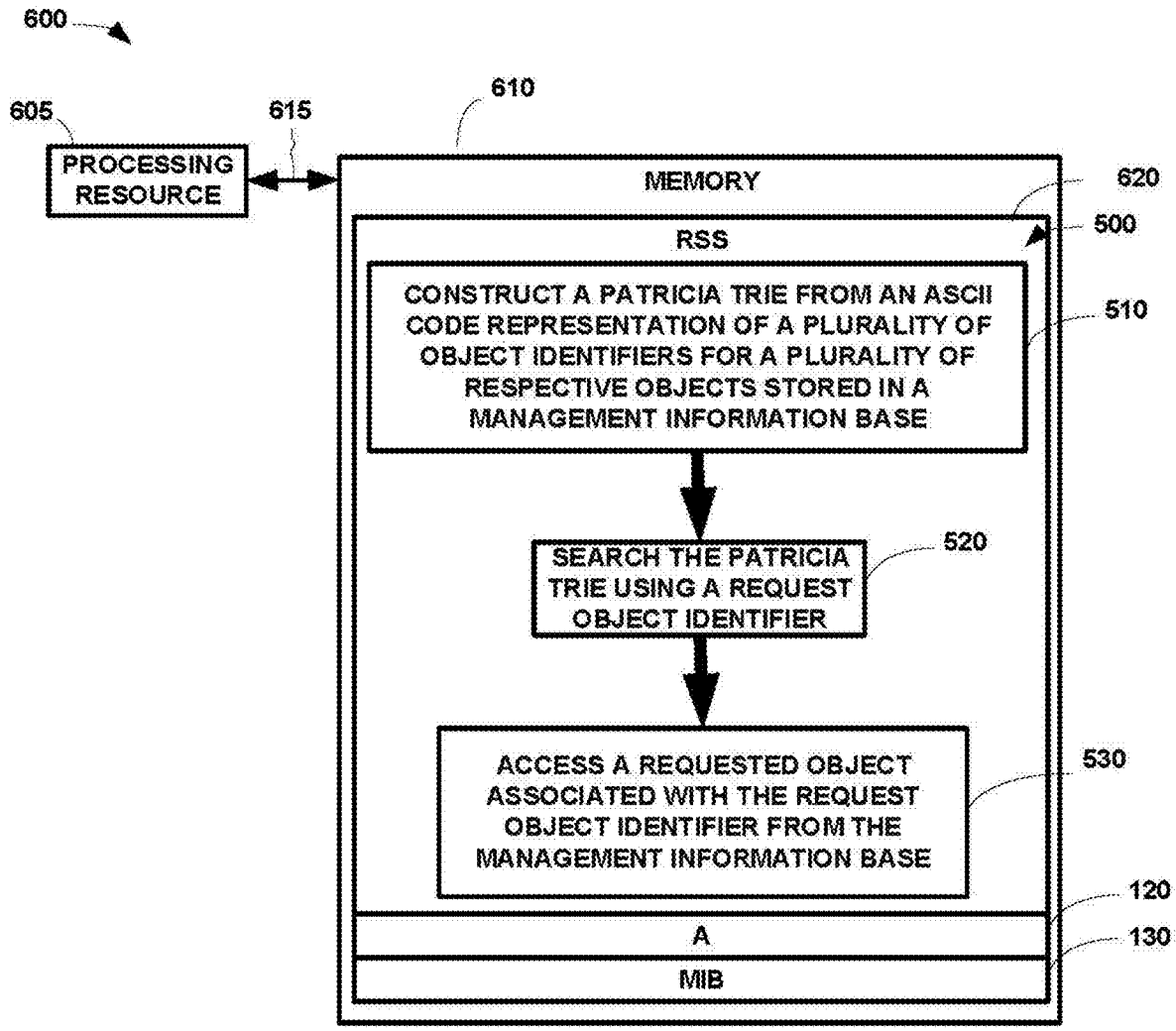
FIG. 6 depicts selected portions of the hardware and software architectures of a network device of the computing system of FIG. 1 hosting a SNMP Agent that may execute the method of FIG. 5.

FIG. 6 depicts selected portions of the hardware and software architectures of a network device 600 of the computing system of FIG. 1 hosting a SNMP Agent 120 that may execute the method 500 of FIG. 5. The network device 600 includes a processing resource 605 communicating with a memory 610 over a bus system 615. The memory 610 is a computer-readable, non-transitory medium. The memory 610 is encoded with role specific instructions ("RSS") 620 that may be executed by the processing resource 605. The role specific instructions 520 include instructions to perform the steps 510, 520, 530 of the method 500 as described above when executed by the processing resource. A SNMP Agent ("A") 120 and a MIB 130 also reside on the memory 610. The processing resource 605 performs the method 500 through the SNMP Agent 120 on the MIB 130 in this particular example.

To promote an understanding of that which is claimed below, the construction of an example Patricia trie will now be discussed. Table 1 includes six data objects from which a Patricia trie will be constructed using the method 700 of FIG. 7 as illustrated in FIG. 8-FIG. 12. Table 1 presents each data object OBJECT 1-OBJECT 7 in binary ASCII and hexadecimal representations.

trie will be built from the Object Identifiers in Table 1, that are already presented in binary ASCII code representations therein. The method 700 continues by building (at 720) a binary trie 800, shown in FIG. 8, from the ASCII code representations. Since this example is using only the last four bits of each Object Identifier, the binary trie 800 is also constructed using only the last four bits of each Object Identifier.

The binary trie 800 includes a plurality of nodes 805-817. Some of the nodes—i.e., nodes 806, 809—are "degree one nodes", meaning they only have one child. (Remember, each node may have no more than two child nodes but may have fewer.) Other nodes—i.e., nodes 805, 807-808, and 810-813—are "degree two nodes", meaning they have two child nodes. Internal nodes 805-809, 811, and 813 are "empty nodes" because they contain no values and only point to other nodes. Leaf nodes 810, 812, and 814-817 are "value nodes" because they do not point to other nodes and contain values.

Figure 8:
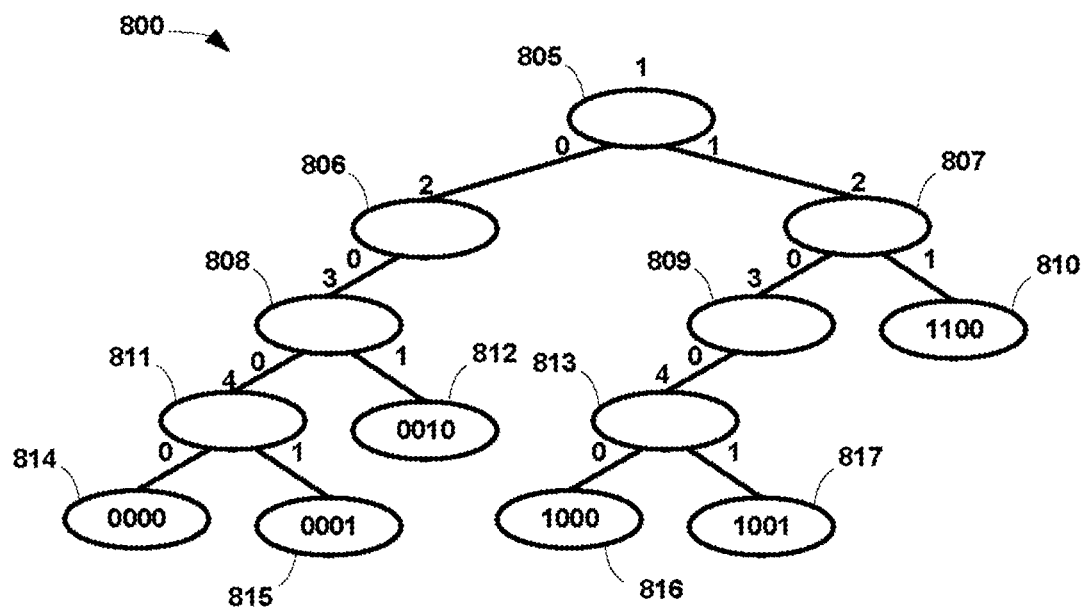
FIG. 8 illustrates a binary trie constructed from the information in Table 1.

Note that in FIG. 8 the leaf nodes 810, 812, and 814-817 are shown containing a value of the last four bits of a respective Object Identifier. Those in the art having the benefit of this disclosure that in a real implementation the leaf nodes 810, 812, and 814-817 will actually contain the values of the data object associated with the Object Identifier used to navigate the binary trie 800 to that node in a manner described more fully below. Thus, the leaf node 815 will contain the value associated with the Object Identifier OBJECT 2, or 00110001 00110011 00110110 0011000 00110010 00110010 00110001 in binary ASCII.

Each internal node includes an associated "decision bit" that establishes the directionality of the binary trie 800. The decision bit tells the search which bit to examine at that particular node in order to navigate the trie. Each internal node 805-809, 811, 813 is shown in FIG. 8 with its associated decision bit number. Bits are numbered in this context

TABLE 1

Data Objects 1-6.

| OBJECT | BASE | BYTE 1 | BYTE 2 | BYTE 3 | BYTE 4 | BYTE 5 | BYTE 6 |
|---|---|---|---|---|---|---|---|
| OBJECT 1 | Hex | 31 | 33 | 36 | 31 | 32 | 30 |
|  | Binary | 00110001 | 00110011 | 00110110 | 00110001 | 00110010 | 00110000 |
| OBJECT 2 | Hex | 31 | 33 | 36 | 31 | 32 | 31 |
|  | Binary | 00110001 | 00110011 | 00110110 | 00110001 | 00110010 | 00110001 |
| OBJECT 3 | Hex | 31 | 33 | 36 | 31 | 32 | 32 |
|  | Binary | 00110001 | 00110011 | 00110110 | 00110001 | 00110010 | 00110010 |
| OBJECT 4 | Hex | 31 | 33 | 36 | 31 | 32 | 38 |
|  | Binary | 00110001 | 00110011 | 00110110 | 00110001 | 00110010 | 00111000 |
| OBJECT 5 | Hex | 31 | 33 | 36 | 31 | 32 | 39 |
|  | Binary | 00110001 | 00110011 | 00110110 | 00110001 | 00110010 | 00111001 |
| OBJECT 6 | Hex | 31 | 33 | 36 | 31 | 32 | 3C |
|  | Binary | 00110001 | 00110011 | 00110110 | 00110001 | 00110010 | 00111100 |

Each data object OBJECT 1-OBJECT 6 is six bytes long, each of the first five bytes being the same for each of the data objects. The data objects OBJECT 1-OBJECT 6 only differ in the last four bits of the sixth byte. (Or, in hexadecimal, the last digit.) The data objects OBJECT 1-OBJECT 6 end in 0, 1, 3, 8, 9, and 12, respectively. For purposes of clarity, only the last four bits of the binary representation of OBJECT 1-OBJECT 6 shall be used in the following discussion.

The method begins by scrambling the plurality of Object Identifiers (at 710) to respective ASCII code representations for each object in the Management Information Base. The ASCII code representations are then concatenated together to create a single bit string. For present purposes, the Patricia from left to right—i.e., the leftmost of the four bits being bit 1 and the rightmost of the four bits being bit 4. Table 2, set forth below, relates each internal node 805-809, 811, 813 to its respective decision bit value.

TABLE 2

Internal Nodes and Respective Decision Bit Values

| Node | Decision Bit Value |
|---|---|
| 805 | 1 |
| 806 | 2 |

TABLE 2-continued

Internal Nodes and
Respective Decision Bit Values

| Node | Decision Bit Value |
|---|---|
| 807 | 2 |
| 808 | 3 |
| 809 | 3 |
| 811 | 4 |
| 813 | 4 |

For instance, assume a search for the value associated with Object Identifier OBJECT 2, whose last four bits are 0001, on the binary trie 800. When the search enters the binary trie 800, it first encounters the root node 805, whose decision bit is "1". The first, or leftmost, bit in 0001 is a "0", and so the search moves to the left to node 806. The decision bit for node 806 is "2", and the second, or second leftmost, bit in 0001 is another "0", and so the search moves to the left to node 808. The decision bit for node 808 is "3", and the third, or third leftmost, bit in 0001 is another "0". The search therefore moves to the left to node 811, whose decision bit is "4". The fourth, or fourth leftmost, bit in 0001 is a "1" and so the search moves to the right to node 815. Node 815 is a leaf node, and therefore has no decision bit and has no children. It contains the value of the data object associated with the Object Identifier OBJECT 2 which can then be accessed.

Also, for instance, consider a search for the data object associated with the Object Identifier OBJECT 6, whose last four bits are 1100. Upon entering the binary trie 800, the search encounters the root node 805 whose decision bit is "1". The first bit in 1100 is a "1" and so the search moves to the right to node 807. The decision bit for node 807 is "2", and the second, or second leftmost, bit in 1100 is a "1". The search moves to the right to node 810. Node 810 is a leaf node without a decision bit and containing a value associated with the Object Identifier OBJECT 6.

Figure 9:
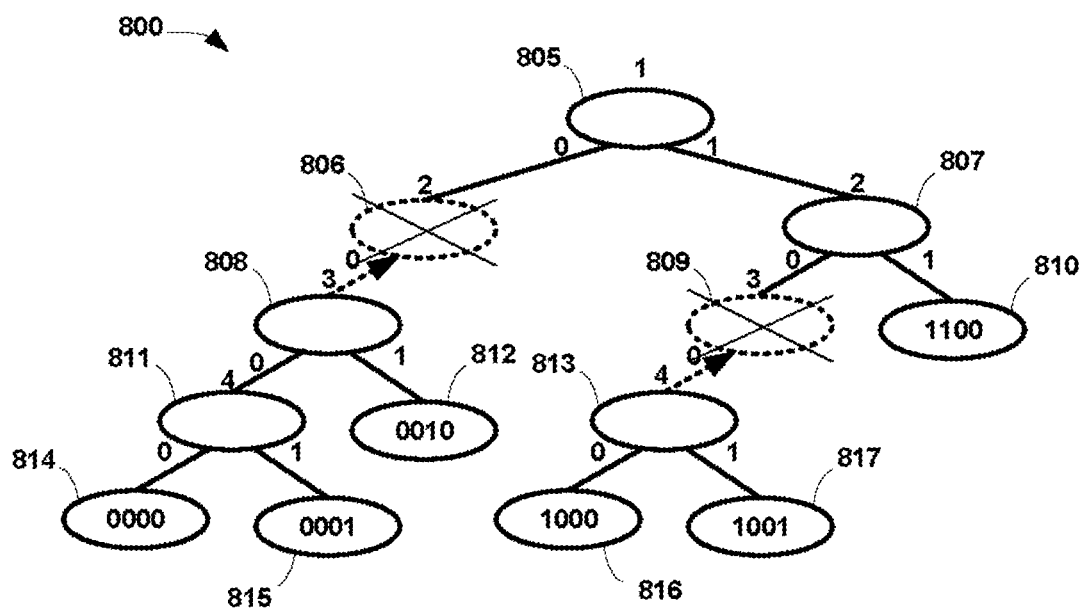
FIG. 9 illustrates a first level of compression in the binary trie of FIG. 8.
Figure 10:
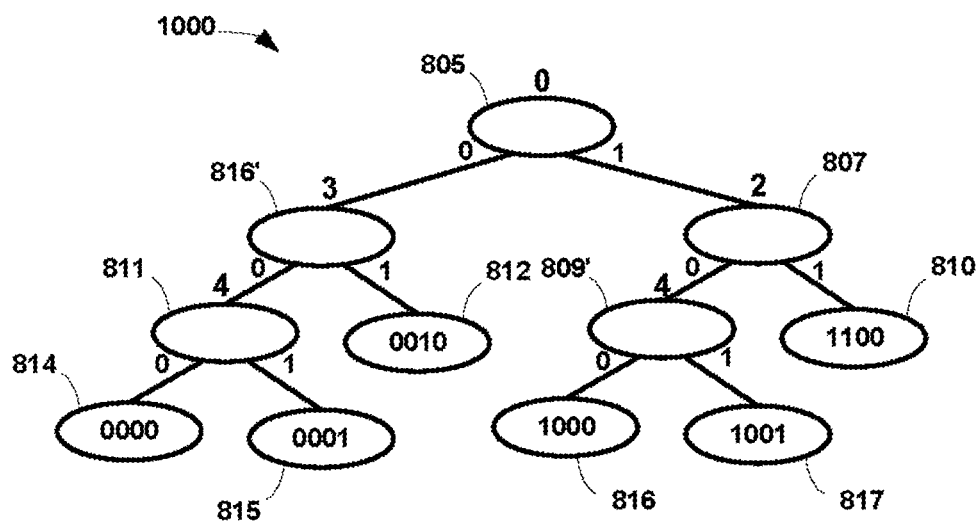
FIG. 10 illustrates the results of the first level of compression in FIG. 9.

However, the subject matter claimed below does not operate on a binary trie like the binary trie 800, but rather a Patricia trie. The binary trie 800 is the starting point for the compression to the Patricia trie. Returning to FIG. 7, the method 700 continues by compressing (at 730) the binary trie 800 by eliminating degree one nodes. As shown in FIG. 8, there are two degree one nodes-nodes 806 and 809. These nodes are eliminated as conceptually illustrated in FIG. 9 and replaced by their one child nodes 808, 813 to create new nodes 806', 809', as shown in FIG. 10. This may also be conceptualized as merging the child nodes 808, 813 with their degree one node parents. Either way, the binary trie 800 in FIG. 8 is compressed to form the binary trie 1000 in FIG. 10. Each node in the tree is now a degree two node and this may be considered a first level of compression.

The method 700 then determines (at 740) a decision bit number for each degree two node in the binary trie 1000. In general, each original degree two node in the binary trie 800 keeps its original decision number. Thus, for instance, the node 811 in the binary trie 1000 keeps its decision number of "4" that it had in the binary trie 800 in FIG. 8. New nodes created by merging or replacing degree one nodes—e.g., nodes 806', 809'-retain the decision bit of the child node from which they were created. Thus, since node 806 in the binary trie 800 had a decision number of "3", the node 806' in the binary trie 1000 also has a decision number of "3".

Figure 11:
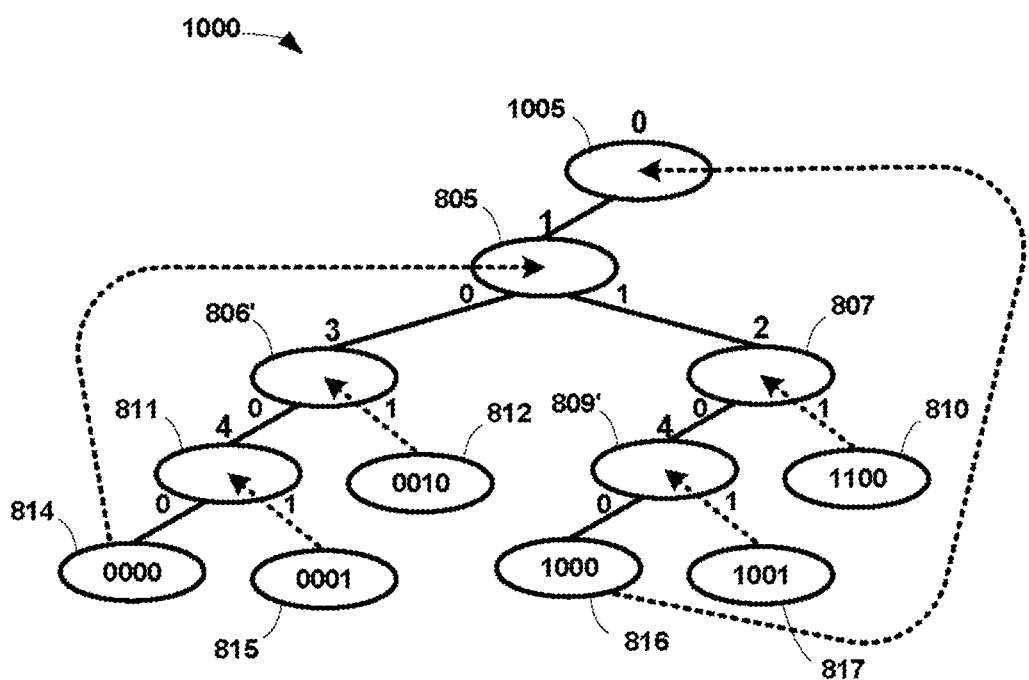
FIG. 11 illustrates a second level of compression performed on the trie of FIG. 10.

Returning to FIG. 7, the method 700 continues by replacing (at 750) each empty degree two node with a value degree two node. This is illustrated in FIG. 11 for the binary trie 1000 of FIG. 10. In this example, the right child node of each empty node is merged with the empty node and the left child of an empty node is merged with another empty node higher in the trie or in a newly created node.

Figure 7:
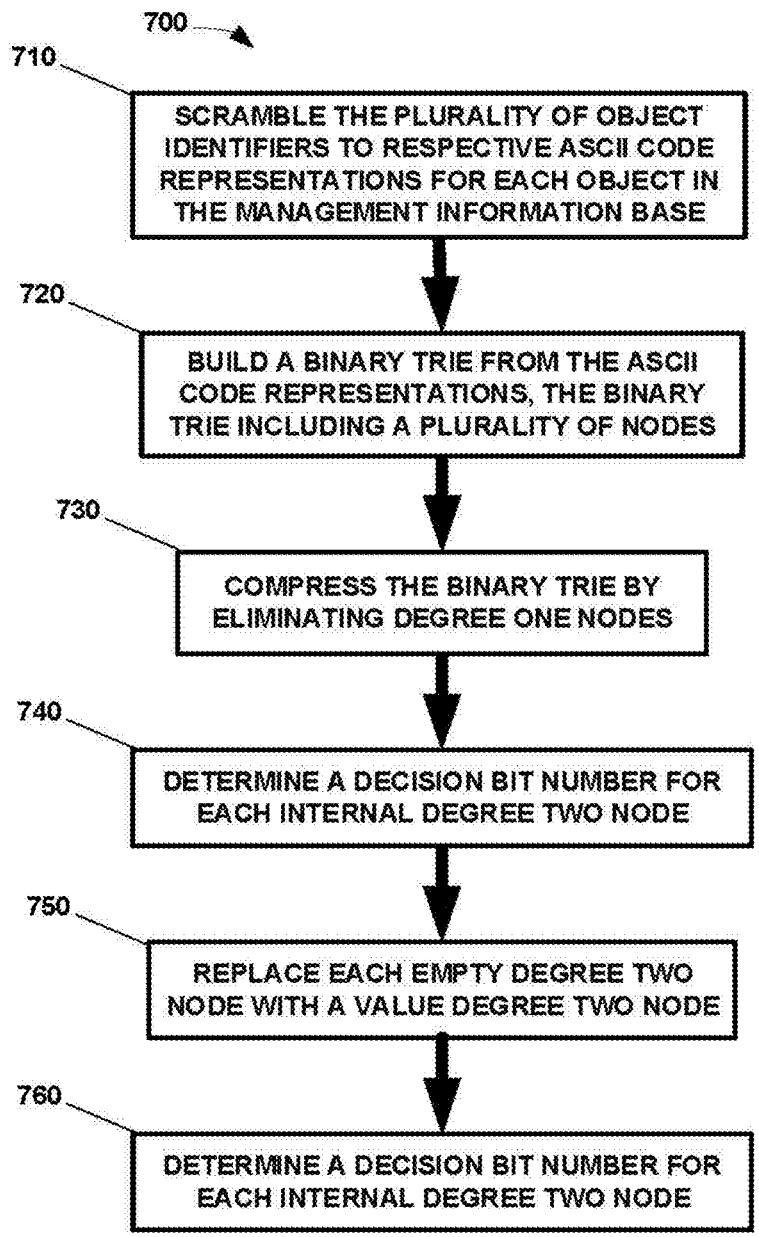
FIG. 7 depicts a method performed in accordance with one or more examples disclosed herein.

In the binary trie 1000, as shown in FIG. 11, the empty nodes are 805, 806', 807, 809', 810, and 811. Accordingly, the child nodes 810, 812, 815, and 817 are merged with their empty parent nodes 807, 806', 811, 809', respectively. The left child nodes 814, 816 cannot be merged with their parent nodes since they are no longer empty nodes. Node 814 is instead merged with empty node 805 higher up the binary trie 1000. There then are no longer any empty nodes in the binary trie 1000. A new empty node 1005 is then created into which the node 816 is merged. As shown in FIG. 7, the method 700 then continues by determining (at 760) the decision bit for each degree two node.

Figure 12:
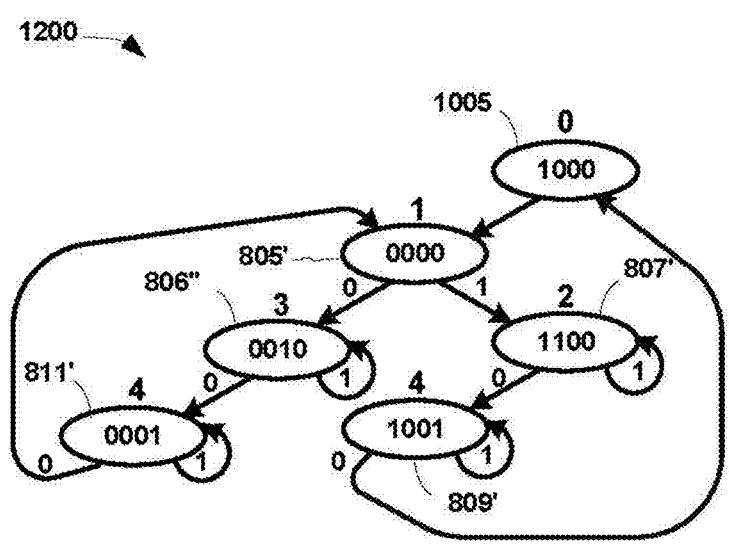
FIG. 12 illustrates the results of the second level of compression in FIG. 11.

The result of this second level of compression is the Patricia trie 1200 shown in FIG. 12. Note that each node is still a degree two node with a decision bit, although sometimes a node is its own child. Note also that the values of the decision bits are not as tied to their respective node's location in the trie as they are in the binary trie 800 of FIG. 8.

A process for searching the Patricia trie 1200 in FIG. 12 may look like the following pseudo-code:

```
while (TRUE)
    db=(oid>>(OID_BIT_NUM-cur→db)) & 0x01;
    if (cur→db>parent→db)
        parent=cur;
        if (db is equal to 0)
            cur=cur→left;
        else
            cur=cur→right;
    else break;
return cur;
```

An SNMP GETNEXT request may look like:
getnext -v 2c -c public 1.3.6.1.2.2
The GETNEXT operation on the Patricia trie 1200 of FIG. 12 would return:
1.3.6.1.2.8
An SNMP Walk request may look like:
walk -v 2c -c public 1.3.6.1.2.2
The WALK operation on the Patricia trie 1200 of FIG. 12 would return:
1.3.6.1.2.2
1.3.6.1.2.8
1.3.6.1.2.9
1.3.6.1.2.12
An SNMP WALK operation might also look something like:
snmpwalk -v 2c -c public 1.3.6.1
The WALK operation on the Patricia trie 1200 of FIG. 12 would return:
1.3.6.1.2.0
1.3.6.1.2.1
1.3.6.1.2.2
1.3.6.1.2.8
1.3.6.1.2.9
1.3.6.1.2.12

In the illustrated examples, the nodes "carry" their decision bit as they are moved within the trie and merged with other nodes in the first level of compression. For instance, as the node 808 is merged into the node 806 as shown in FIG. 9 to create node 806' shown in FIG. 10, the decision bit of the node 808 becomes the decision bit of the new node 806'. This is the case is generally the opposite in the second level of compression as well. For instance, the value node 815 does not have a decision bit whereas the empty node 811 does. As the value node 815 is merged into the empty node 811 as shown in FIG. 11, the new node 811' retains the decision bit of the empty node 811. This is function of maintaining the directionality of the Patricia trie 1200. Thus, the act of determining a node's decision bit value will depend on the context of the trie manipulations being performed.

Furthermore, other examples might choose to determine the decision bit of nodes differently as the binary trie of FIG. 8 is transformed into the Patricia trie 1200 of FIG. 12. For instance, some examples might track the history of nodes as they are created in the first and second levels of compression and then, at the end of the second level of compression, assign the decision bit value base on the tracked history. The history may be tracked in, for instance, a table (not shown). In such examples, the decision bit determination might be made in a single act rather than in the distributed two act determination in the example illustrated in FIG. 7-FIG. 12.

Those in the art having the benefit of this disclosure will appreciate that the binary trie 800 in FIG. 8 and the Patricia trie 1200 in FIG. 12 are "subtries" of larger tries. In an actual implementation, the tries will be sufficiently large to encompass each bit of each byte of each Object Identifier. However, only the subtries are shown and discussed for the sake of clarity and so as not to obscure that which is claimed below.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The technique is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed is:

1. A method for use in a Simple Network Management Protocol ("SNMP") computing environment, comprising:
   constructing, by an SNMP agent, a Patricia trie from an ASCII code representation of a plurality of Object Identifiers for a plurality of respective objects stored in a Management Information Base by:
      scrambling the plurality of Object Identifiers to respective ASCII code representations for each object in the Management Information Base;
      building a binary trie from the ASCII code representations, the binary trie including a plurality of nodes, wherein:
         the plurality of nodes includes degree one nodes and degree two nodes; and
         the degree one nodes and the degree two nodes include empty nodes and value nodes,
      compressing the binary trie by eliminating the degree one nodes;
      replacing each empty degree two node with a value degree two node; and
      determining a decision bit number for each degree two node;
   searching, by the SNMP agent, the Patricia trie using a request Object Identifier; and
   accessing, by the SNMP agent, a requested object associated with the request Object Identifier from the Management Information Base.

2. The method of claim 1, wherein determining the decision bit number for each degree two node includes carrying a decision bit from a child node of a degree one node merged with the degree one node.

3. The method of claim 2, wherein determining the decision bit number for each degree two node includes carrying a decision bit of an empty node merged with a value node.

4. The method of claim 3, wherein determining the decision bit number for each degree two node includes:
   carrying a decision bit from a child node of a degree one node merged with the degree one node; and
   carrying a decision bit of an empty node merged with a value node.

5. The method of claim 1, further comprising:
receiving a SNMP request for data; and
parsing the received SNMP request to obtain the request Object Identifier.

6. The method of claim 5, wherein receiving the SNMP request for data includes receiving at least one of a GET, GETNEXT, and WALK request.

7. A Simple Network Management Protocol ("SNMP") computing environment, comprising:
a plurality of network devices;
a SNMP Manager hosted on a first one of the network devices;
a SNMP Agent hosted on a second one of the network devices that, in operation;
constructs a Patricia trie from an ASCII code representation of a plurality of Object Identifiers for a plurality of respective objects stored in a Management Information Base by:
scrambling the plurality of Object Identifiers to respective ASCII code representations for each object in the Management Information Base;
building a binary trie from the ASCII code representations, the binary trie including a plurality of nodes, wherein:
the plurality of nodes includes degree one nodes and degree two nodes; and
the degree one nodes and the degree two nodes include empty nodes and value nodes;
compressing the binary trie by eliminating the degree one nodes;
replacing each empty degree two node with a value degree two node; and
determining a decision bit number for each internal degree two node;
searches the Patricia trie using a request Object Identifier; and
accesses a requested object associated with the request Object Identifier from the Management Information Base.

8. The SNMP computing environment of claim 7, wherein determining the decision bit number for each degree two node includes carrying a decision bit from a child node of a degree one node merged with the degree one node.

9. The SNMP computing environment of claim 7, wherein determining the decision bit number for each degree two node includes carrying a decision bit of an empty node merged with a value node.

10. The SNMP computing environment of claim 7, wherein determining the decision bit number for each degree two node includes:
carrying a decision bit from a child node of a degree one node merged with the degree one node; and
carrying a decision bit of an empty node merged with a value node.

11. The SNMP computing environment of claim 7, wherein the SNMP Agent, in operation, further:
receives a SNMP request for data; and
parses the received SNMP request to obtain the request Object Identifier.

12. The SNMP computing environment of claim 11, wherein the received SNMP request is one of a GET, GETNEXT, and WALK request.

13. The SNMP computing environment of claim 7, wherein the encoded instructions further cause the processing resource to:
receive a SNMP request for data; and
parse the received SNMP request to obtain the request Object Identifier.

14. The SNMP computing environment of claim 13, wherein the received SNMP request is one of a GET, GETNEXT, and WALK request.

15. A computer-readable, non-transitory storage medium encoded with instructions that, when executed by a processing resource, cause the processing resource to:
construct, by an SNMP agent, a Patricia trie from an ASCII code representation of a plurality of Object Identifiers for a plurality of respective objects stored in a Management Information Base by:
scrambling the plurality of Object Identifiers to respective ASCII code representations for each object in the Management Information Base;
building a binary trie from the ASCII code representations, the binary trie including a plurality of nodes, wherein:
the plurality of nodes includes degree one nodes and degree two nodes; and
the degree one nodes and the degree two nodes include empty nodes and value nodes,
compressing the binary trie by eliminating the degree one nodes;
determining a decision bit number for each internal degree two node; and
replacing each empty degree two node with a value degree two node;
search, by the SNMP agent, the Patricia trie using a request Object Identifier; and
access, by the SNMP agent, a requested object associated with the request Object Identifier from the Management Information Base.

16. The computer-readable, non-transitory storage medium of claim 15, wherein the encoded instructions further cause the processing resource to:
receive a SNMP request for data; and
parse the received SNMP request to obtain the request Object Identifier.

17. The computer-readable, non-transitory storage medium of claim 16, wherein the received SNMP request is one of a GET, GETNEXT, and WALK request.

18. The computer-readable, non-transitory storage medium of claim 15, wherein determining the decision bit number for each degree two node includes carrying a decision bit from a child node of a degree one node merged with the degree one node.

* * * * *